United States Patent
Fang (10) Patent No.: US 12,026,335 B2
(45) Date of Patent: Jul. 2, 2024

(54) TOUCH DISPLAY PANEL WITH REDUCED IMPEDANCE OF TOUCH SIGNAL LINE

(71) Applicant: Wuhan China Star Optoelectronics Semiconductor Display Technology Co., Ltd., Hubei (CN)

(72) Inventor: Liang Fang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/421,431

(22) PCT Filed: May 31, 2021

(86) PCT No.: PCT/CN2021/097497
§ 371 (c)(1),
(2) Date: Jul. 8, 2021

(87) PCT Pub. No.: WO2022/241833
PCT Pub. Date: Nov. 24, 2022

(65) Prior Publication Data
US 2024/0019959 A1    Jan. 18, 2024

(30) Foreign Application Priority Data
May 20, 2021    (CN) .......................... 202110549021.9

(51) Int. Cl.
*G06F 3/041*    (2006.01)
*G06F 3/044*    (2006.01)

(52) U.S. Cl.
CPC ........ *G06F 3/04164* (2019.05); *G06F 3/0412* (2013.01); *G06F 3/0418* (2013.01); *G06F 3/0445* (2019.05)

(58) Field of Classification Search
CPC .. G06F 3/0445; G06F 3/0418; G06F 3/04164; G06F 3/0412
See application file for complete search history.

(56) References Cited

U.S. PATENT DOCUMENTS

| 2021/0055831 A1* | 2/2021 | Long | H01L 27/124 |
| 2022/0147186 A1* | 5/2022 | Bo | G06F 3/0446 |
| 2022/0206622 A1* | 6/2022 | Yamanaka | G06F 3/0445 |

FOREIGN PATENT DOCUMENTS

| CN | 107390441 | 11/2017 |
| CN | 108182883 | 6/2018 |
| CN | 108646451 | 10/2018 |
| CN | 110034168 | 7/2019 |
| CN | 110137214 | 8/2019 |
| CN | 111290662 | 6/2020 |

(Continued)

*Primary Examiner* — Liliana Cerullo (57) ABSTRACT

A touch display panel is provided, which includes a touch structure layer. The touch structure layer includes touch signal lines and touch electrodes. The touch electrodes include electrode lines. Each of the touch signal lines includes signal main lines and redundant signal lines disposed on one side of one row of first sub-pixels. Any one of the signal main lines and signal main lines adjacent to one side of the one of the signal main lines are spaced apart by at least two rows of the first sub-pixels, and the one of the signal main lines and signal main lines adjacent to another side of the one of the signal main lines are spaced apart by at least one row of the first sub-pixels.

20 Claims, 7 Drawing Sheets

(56) References Cited

FOREIGN PATENT DOCUMENTS

| CN | 11162121    | 9/2020 |
| CN | 111665998   | 9/2020 |
| CN | 111722762   | 9/2020 |
| CN | 112198990   | 1/2021 |
| CN | 112578940   | 3/2021 |
| JP | 2014-167724 | 9/2014 |
| JP | 2018-112859 | 7/2018 |

* cited by examiner

TOUCH DISPLAY PANEL WITH REDUCED IMPEDANCE OF TOUCH SIGNAL LINE

RELATED APPLICATIONS

This application is a National Phase of PCT Patent Application No. PCT/CN2021/097497 having International filing date of May 31, 2021, which claims the benefit of priority of Chinese Patent Application No. 202110549021.9 filed on May 20, 2021. The contents of the above applications are all incorporated by reference as if fully set forth herein in their entirety.

FIELD AND BACKGROUND OF THE INVENTION

The present application relates to the field of touch display technology, and specifically to a touch display panel.

A touch function has become one of standard configurations of most display devices. Wherein, capacitive touch screens are widely used, and their basic principle is to use a finger or a tool such as a stylus pen to generate capacitance with the touch screens, and electrical signals formed by changes of the capacitance before and after touching are used to confirm whether panels are touched and to confirm touch coordinates. One important touch technology of capacitive-type touch display panels is a self-capacitive type.

During research and practice processes of prior art, the inventor of the present application found that when using a function of the stylus pen, a size of a corresponding touch electrode block can be reduced, and a total number of touch signal lines in a corresponding row direction is increased. In order to ensure touch performance, the touch signal lines need to be configured within a horizontal width of the corresponding touch electrode block. However, configuration in this way is prone to cause impedance of the touch signal lines to be too large or an amount of the touch electrodes to be reduced, which affects touch effect.

SUMMARY OF THE INVENTION

Embodiments of the present application provides a touch display panel, which can remedy a technical problem of excessive impedance of touch signal lines caused by increment of the touch signal lines and the decrement of sizes of the touch electrodes.

One embodiment of the present application provides a touch display panel, including a substrate, a light-emitting device layer, and a touch structure layer disposed sequentially in a stacked manner. The light-emitting device layer includes a plurality of rows of first sub-pixels arranged along a first direction. The touch structure layer includes a touch signal line sub-layer and a touch electrode sub-layer disposed on a layer different from the touch signal line sub-layer. The touch electrode sub-layer includes a plurality of touch electrodes. The touch signal line sub-layer includes a plurality of touch signal lines. Each of the touch signal lines is connected to one of the touch electrodes correspondingly.

Wherein, each of the touch signal lines includes signal main lines extending along the first direction and disposed on a side of one row of the first sub-pixels and redundant signal lines disposed extending along a direction of any side of the signal main lines.

Any one of the signal main lines and signal main lines adjacent to one side of the one of the signal main lines are spaced apart by at least two rows of the first sub-pixels, and the one of the signal main lines and signal main lines adjacent to another side of the one of the signal main lines are spaced apart by at least one row of the first sub-pixels.

Optionally, in some embodiments of the present application, the touch signal lines at least encircle a part of a row of first sub-pixels adjacent to the touch signal lines.

Optionally, in some embodiments of the present application, the redundant signal lines include first redundant signal lines disposed extending along the direction of any side of the signal main lines, and the first redundant signal lines and the signal main lines connected to the first redundant signal lines encircle the first sub-pixels adjacent to the signal main lines.

Optionally, in some embodiments of the present application, the redundant signal lines include second redundant signal lines disposed extending along the direction of any side of the signal main lines, and the second redundant signal lines and the signal main lines connected to the second redundant signal lines encircle a part of the first sub-pixels adjacent to the signal main lines.

Optionally, in some embodiments of the present application, the touch electrodes include a plurality of electrode lines electrically connected to each other, the electrode lines include electrode main lines and electrode sub-lines, and the electrode sub-lines are disposed extending along a direction of any side of the electrode main lines;
 at least one of the electrode sub-lines composes a first unit;
 at least one of the redundant signal lines composes a second unit;
 the signal main lines and the electrode main lines are spaced apart and arranged alternately in a second direction in a front-view pattern of the touch structure layer; and the first unit is arranged with the second unit in the first direction. The second direction is disposed intersecting the first direction.

Optionally, in some embodiments of the present application, the redundant signal lines include third redundant signal lines disposed extending along a direction of a side of the second redundant signal lines, and the third redundant signal lines and the second redundant signal lines connected to the third redundant signal lines encircle the first sub-pixels adjacent to the signal main lines.

Optionally, in some embodiments of the present application, the third redundant signal lines are disposed overlapping a part of the electrode main lines.

Optionally, in some embodiments of the present application, the signal main lines and the electrode main lines are disposed alternately in the second direction, and the first unit and the second unit are disposed alternately in the first direction.

Optionally, in some embodiments of the present application, the light-emitting device layer includes a plurality of sub-pixels, and the sub-pixels are arranged in columns along the second direction;
 the touch signal lines and the electrode lines are disposed on a periphery of the sub-pixels; and
 a part of the signal main lines and the electrode sub-lines are disposed alternately in a region of one column of the sub-pixels in a front-view pattern composed of the touch structure layer and the sub-pixels.

Optionally, in some embodiments of the present application, the redundant signal lines and a part of the electrode main lines are disposed alternately in a region of another column of the sub-pixels.

Optionally, in some embodiments of the present application, the sub-pixels are arranged in rows along the first direction; and in a region of one row of the sub-pixels, the electrode main lines are disposed on a side of the sub-pixels, and two adjacent first units are spaced apart by at least one of the sub-pixels.

Optionally, in some embodiments of the present application, in a region of another row of the sub-pixels, the signal main lines are disposed on a side of the sub-pixels, and two adjacent second units are spaced apart by at least one of the sub-pixels.

Optionally, in some embodiments of the present application, the redundant signal lines and the electrode main lines are disposed alternately in a region of another column of the sub-pixels;

the first redundant signal lines include first line segments and second line segments; the first line segments extend from the signal main lines along a third direction, and the second line segments extend from the first line segments along a fourth direction and are connected to the signal main lines; and the second redundant signal lines includes third line segments, fourth line segments, and fifth line segments, the third line segments extend from the signal main lines along the second direction, the fourth line segments extend from the third line segments along the third direction, and the fifth line segments extend from the third line segments along the fourth direction.

Optionally, in some embodiments of the present application, the plurality of electrode sub-lines include a first electrode sub-line and a second electrode sub-line. the first electrode sub-line and the second electrode sub-line are disposed alternately in a region of one column of the sub-pixels.

The first electrode sub-line includes sixth line segments, seventh line segments, and eighth line segments. The sixth line segments extend from the electrode main lines along a direction opposite to the second direction. The seventh line segments extend from the sixth line segments along a direction opposite to the third direction. The eighth line segments extend from the sixth line segments along a direction opposite to the fourth direction.

The second electrode sub-line includes ninth line segments and tenth line segments. The ninth line segments extend from the electrode main lines to the direction opposite to the third direction. The tenth line segments extend from the ninth line segments along the direction opposite to the fourth direction and are connected the electrode main lines.

Optionally, in some embodiments of the present application, the touch electrodes further include connection lines disposed on a same layer as the electrode lines, the connection lines are connected between two adjacent electrode lines, and the connection lines are disposed partially overlapping the touch signal lines.

Optionally, in some embodiments of the present application, the touch structure layer further includes an insulation layer disposed between the touch signal line sub-layer and the touch electrode sub-layer, at least one via hole is defined on the insulation layer, and one of the touch electrodes is electrically connected to the touch signal lines corresponding to the one of the touch electrodes through the at least one via hole.

Optionally, in some embodiments of the present application, the touch display panel further includes an encapsulation layer disposed on the light-emitting device layer, and the touch signal line sub-layer, the insulation layer, and the touch electrode sub-layer are sequentially disposed on the encapsulation layer.

Optionally, in some embodiments of the present application, the touch display panel further includes an encapsulation layer disposed on the light-emitting device layer, the touch electrode sub-layer, the insulation layer, and the touch signal line sub-layer are sequentially disposed on the encapsulation layer.

Optionally, in some embodiments of the present application, lengths of the plurality of touch signal lines are same.

Optionally, in some embodiments of the present application, the touch display panel includes a display region and a peripheral region disposed on a side of the display region, the touch electrodes are disposed in the display region in a matrix manner; and the touch display panel further includes a touch chip and a plurality of peripheral wirings, the touch chip and the peripheral wirings are disposed in the peripheral region, the peripheral wirings are electrically connected to the touch chip, and each of the peripheral wirings is electrically connected to one of the touch signal lines.

Optionally, in some embodiments of the present application, the touch electrodes are disposed in the display region in a matrix manner.

In the touch structure layer of the embodiments of the present application, the touch signal lines include the signal main lines and the redundant signal lines, and the configuration of the redundant signal lines reduces impedance of the touch signal lines. In addition, carrying out a configuration according to a rule that any one of the signal main lines and adjacent signal main lines of one side the one of the signal main lines are spaced apart by at least two rows of the first sub-pixels, and the one of the signal main lines and signal main lines adjacent to another side of the one of the signal main lines are spaced apart by at least one row of the first sub-pixels, allows more touch signal lines to be disposed in a certain area on the touch electrodes and ensures the touch electrodes have sufficient sensing area.

BRIEF DESCRIPTION OF THE SEVERAL VIEWS OF THE DRAWINGS

To more clearly illustrate the technical solutions of the embodiments of the present disclosure, the accompanying figures of the present disclosure will be described in brief. Obviously, the accompanying figures described below are only part of the embodiments of the present disclosure, from which figures those skilled in the art can derive further figures without making any inventive efforts.

DESCRIPTION OF SPECIFIC EMBODIMENTS OF THE INVENTION

The technical solutions in the embodiments of the present application are clearly and completely described in the following with reference to the accompanying drawings in the embodiments of the present application. Obviously, the described embodiments are only part of the embodiments of the present application, and are not all embodiments of the present application. All other embodiments obtained by those skilled in the art based on the embodiments of the present disclosure without creative efforts are within the scope of the present disclosure. Besides, it should be understood that the specific embodiments described herein are merely for describing and explaining the present application and are not intended to limit the present application. In the present application, unless opposite stated, the orientation words used such as "upper" and "lower" generally refer to the upper and lower directions of the device in actual using or working state, and specifically refer to the drawing directions in the drawings, and "inner" and "outer" refer to the outline of the device.

Embodiments of the present application provide a touch display panel, and detailed descriptions are provided below. It should be noted that a description order of the following embodiments is not intended to limit a preferred order of the embodiments.

Figure 2:
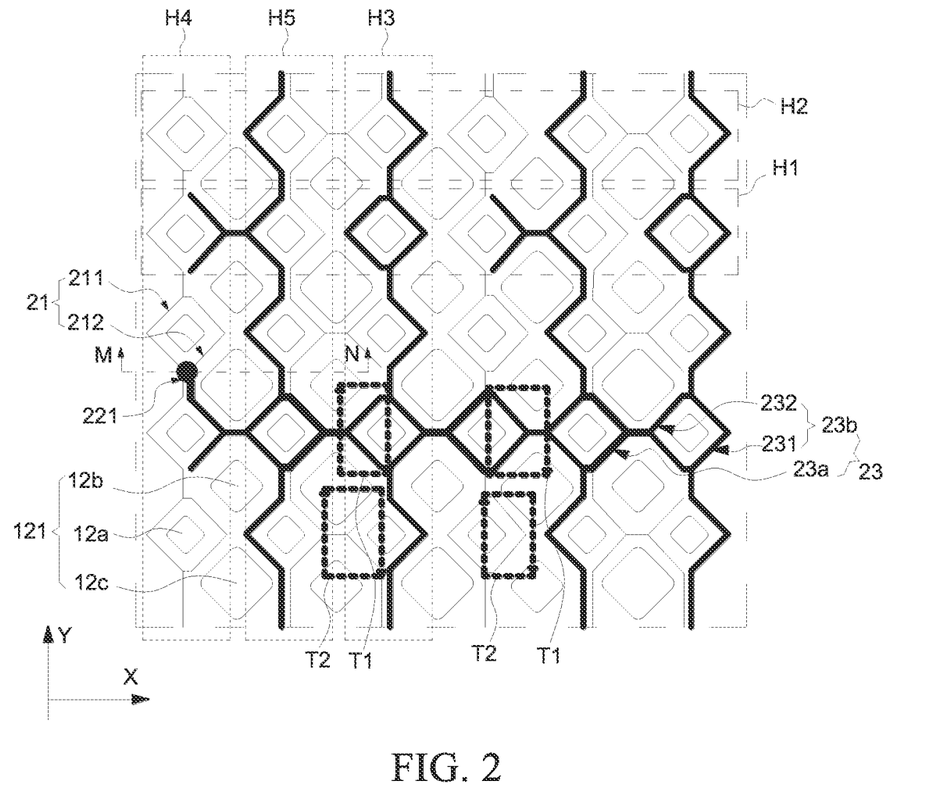
FIG. 2 is an enlarged schematic diagram of a first embodiment of a BB section in FIG. 1.
Figure 6:
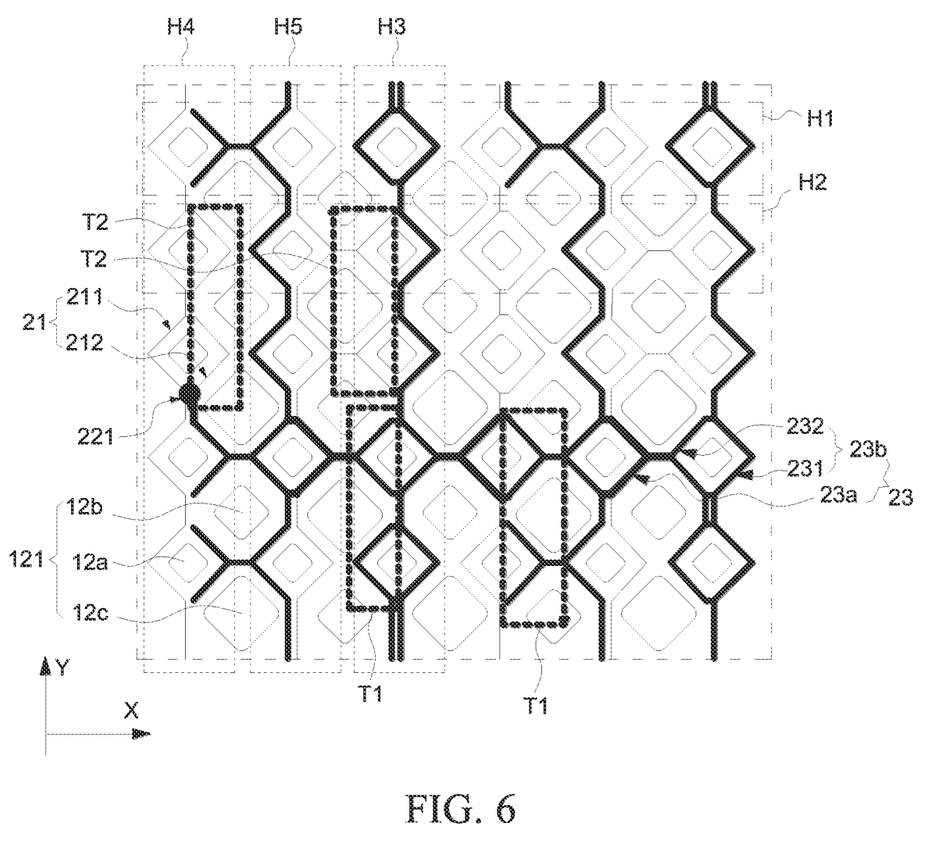
FIG. 6 is an enlarged schematic diagram of a second embodiment of the BB section in FIG. 1.
Figure 7:
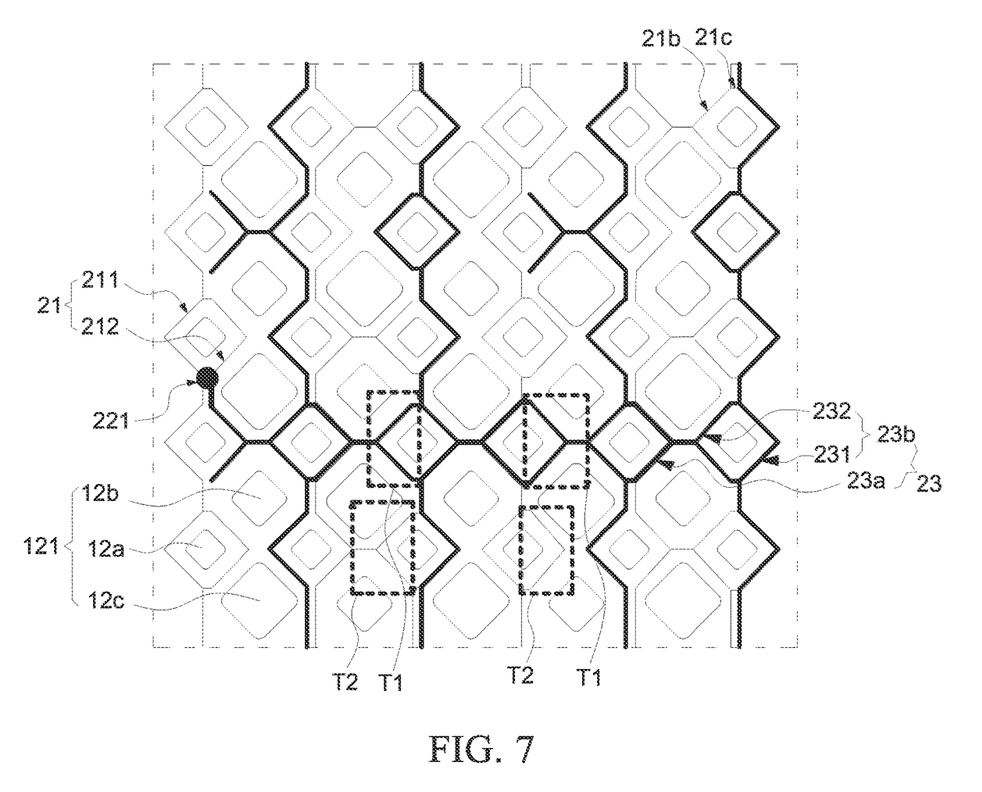
FIG. 7 is an enlarged schematic diagram of a third embodiment of the BB section in FIG. 1.

It should be noted that FIG. 2, FIG. 6, and FIG. 7 are also schematic diagrams of a touch structure layer and sub-pixels corresponding to a part of a certain touch electrode region in a front view.

Figure 1:
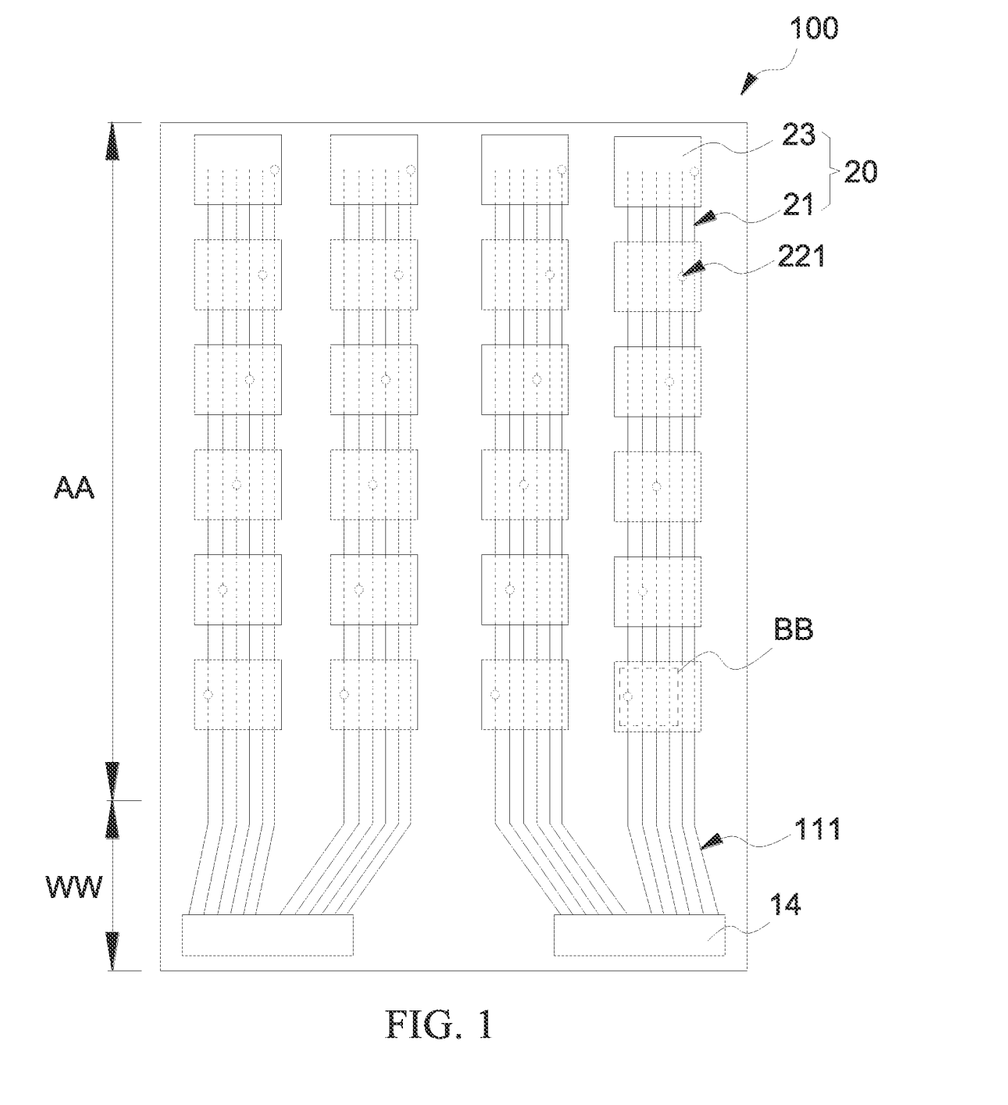
FIG. 1 is a structural schematic diagram of one embodiment of a touch display panel in a front view provided by the present application.
Figure 3:
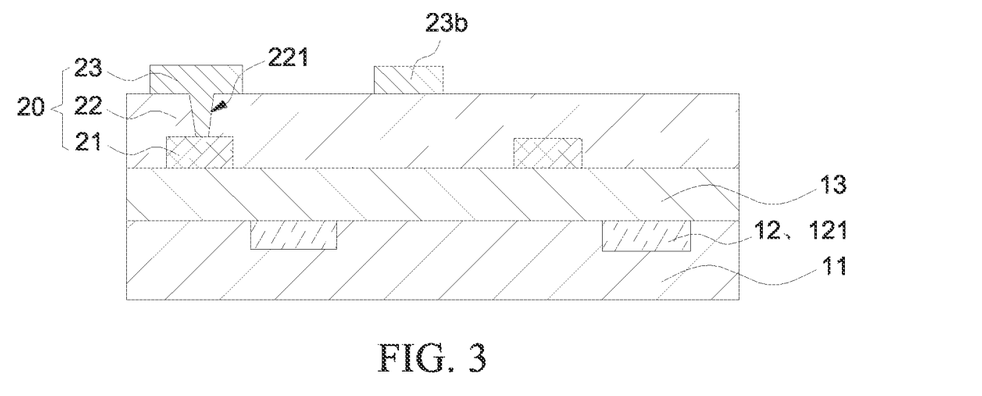
FIG. 3 is a schematic diagram of a sectional structure along line MN in FIG. 2.

Please refer to FIG. 1 and FIG. 3, a first embodiment of the present application provides a touch display panel 100, which includes a substrate 11, a light-emitting device layer 12, an encapsulation layer 13, and a touch structure layer 20 disposed sequentially in a stacked manner. The touch display panel 100 includes a display region AA and a peripheral region WW disposed on a side of the display region AA. The light-emitting device layer 12 includes a plurality of sub-pixels 121.

The plurality of sub-pixels 121 are arranged in rows along a first direction Y. The sub-pixels 121 are arranged in columns along a second direction X. Wherein, the substrate 11 includes a base, and a thin film transistor and a driving circuit disposed on the base.

The touch structure layer 20 includes a touch signal line sub-layer, an insulation layer 22, and a touch electrode sub-layer sequentially disposed on the encapsulation layer 13. The touch electrode sub-layer includes a plurality of touch electrodes 23. The touch signal line sub-layer includes a plurality of touch signal lines 21.

In some embodiments, the touch electrodes 23 can also be disposed on a side of the insulation layer 22 close to the encapsulation layer 13.

Optionally, the touch electrodes 23 are disposed in the display region AA in a matrix manner, and the touch electrodes 23 can also be arranged according to other manners.

At least one via hole 221 is defined on the insulation layer 22. One of the touch electrodes 23 is electrically connected to the touch signal lines 21 corresponding to the one of the touch electrodes 23 through the at least one via hole 221.

The touch display panel 100 further includes a touch chip 14 and a plurality of peripheral wirings 111. The touch chip 14 and the peripheral wirings 111 are disposed in the peripheral region WW. The peripheral wirings 111 are electrically connected to the touch chip 14. Each of the peripheral wirings 111 is electrically connected to one of the touch signal lines 21. Each of the touch signal lines 21 is connected to one of the touch electrodes 23 correspondingly.

Please refer to FIG. 2. The touch electrodes 23 include connection lines 23a and a plurality of electrode lines 23b electrically connected to each other. The connection lines 23a and the electrode lines 23b are disposed on a same layer. Two adjacent electrode lines 23b are spaced apart. The connection lines 23a are connected between two adjacent electrode lines 23b. The connection lines 23a are disposed partially overlapping the touch signal lines 21.

In some embodiments, the connection lines 23a and the electrode lines 23b can be disposed on different layers.

In the first embodiment, two adjacent electrode lines 23b in each touch electrode 23 can be connected through at least one connection line 23a.

Optionally, in the first embodiment, lengths of the plurality of touch signal lines 21 are same, which allows capacitance to be equal. In some embodiments, lengths of the touch signal lines 21 can also be different.

In a front-view pattern of the touch structure layer, the touch signal lines 21 encircle a part of a row of the sub-pixels 121 adjacent to the touch signal lines 21. In other words, the touch signal lines 21 encircle the part of one entire row of the sub-pixels 121. For example, the touch signal lines 21 can encircle several sub-pixels 121 and a part of other sub-pixels 121 in one entire row of the sub-pixels 121; or the touch signal lines 21 can also encircle parts of each sub-pixels 121 in one entire row of the sub-pixels 121.

In the first embodiment, the light-emitting device layer 12 includes a plurality of rows of first sub-pixels 12a arranged along the first direction Y.

Specifically, the light-emitting device layer 12 includes a plurality of sub-pixels 121. The plurality of sub-pixels 121 are arranged in rows along the first direction Y. It should be noted that the first sub-pixels 12a arranged along the first direction Y only indicate that there are the plurality of first sub-pixels 12a arranged in the first direction Y, which includes a situation that the row of the sub-pixels 121 can also have other sub-pixels.

Each touch signal line 21 includes signal main lines 211 extending along the first direction Y and disposed on a side of one row of the first sub-pixels 12a and redundant signal lines 212 disposed extending along a direction of any side of the signal main lines 211.

In addition, any one of the signal main lines 211 and signal main lines 211 adjacent to one side of the one of the signal main lines 211 are spaced apart by at least two rows of the first sub-pixels 12a, and the one of the signal main lines 211 and signal main lines 211 adjacent to another side of the one of the signal main lines 211 are spaced apart by at least one row of the first sub-pixels 12a.

Optionally, any one of the signal main lines 211 and signal main lines 211 adjacent to one side of the one of the signal main lines 211 are spaced apart by two rows of the first sub-pixels 12a or three rows of the first sub-pixels 12a, but less than or equal to four rows of the first sub-pixels 12a; and any one of the signal main lines 211 and signal main lines 211 adjacent to another side of the one of the signal main lines 211 are spaced apart by one row of the first sub-pixels 12a, two rows of the first sub-pixels 12a, or three rows of the first sub-pixels 12a, but less than or equal to four rows of the first sub-pixels 12a.

The touch signal line 21 includes the signal main lines 211 and the redundant signal lines 212. The configuration of the redundant signal lines 212 reduces impedance of the touch signal lines 21. In addition, carrying out the configuration according to a rule that any one of the signal main lines 211 and adjacent signal main lines 211 of one side of the one of the signal main lines 211 are spaced apart by at least two rows of the first sub-pixels 12a, and the one of the signal main lines 211 and signal main lines 211 adjacent to another side of the one of the signal main lines 211 are spaced apart by at least one row of the first sub-pixels 12a, allows more touch signal lines 21 to be disposed in a certain area on the touch electrodes 23 and ensures the touch electrodes 23 have sufficient sensing area.

In the first embodiment, the electrode lines 23b include electrode main lines 231 and electrode sub-lines 232. The electrode sub-lines 232 are disposed extending along a direction of any side of the electrode main lines 231. At least one of the electrode sub-lines 232 composes a first unit T1.

At least one of the redundant signal lines 212 composes a second unit T2.

In a front-view pattern of the touch structure layer 20, the signal main lines 211 are arranged with the electrode main lines 231 in the second direction X. The first unit T1 is arranged with the second unit T2 in the first direction Y.

In the touch display panel 100 of the first embodiment, one electrode sub-line 232 acts as one first unit T1. One redundant signal line 212 acts as one second unit T2.

Wherein, the second direction X is disposed intersecting the first direction Y. Optionally, the second direction X is perpendicular to the first direction Y.

The redundant signal lines 212 extending from one side of the signal main lines 211 is adopted in the first embodiment, which serves an effect of reducing impedance of the touch signal lines 21.

Optionally, the signal main lines 211 and the electrode main lines 231 are disposed alternately in the second direction X.

In the touch structure layer 20 of the first embodiment of the present application, arranging the signal main lines 211 and the electrode main lines 231 alternately along the second direction X is adopted. Specifically, the signal main lines 211 and the redundant signal lines 212 act as whole bodies to be arranged alternately with the electrode lines 23b along the second direction X to improve touch sensing areas and uniformity of arrangement of density of the electrode lines. Disposing the redundant signal lines 212 on the signal main lines 211 serves the effect of reducing the impedance of the touch signal line 21, and by adopting configuration of arranging the redundant signal lines 212 and the electrode sub-lines 232 along the first direction Y, wiring areas of the electrode lines 23b in the touch electrodes 23 are ensured, thereby ensuring the touch effectiveness of the touch electrodes 23.

In addition, by making the signal main lines 211 and the redundant signal line 212 act as whole bodies and disposing them spaced apart with the electrode lines 23b, i.e. disposing in a non-overlapping manner, a risk of short-circuiting of the touch signal lines 21 and the touch electrodes 23 is reduced.

Optionally, in the first embodiment, the first unit T1 and the second unit T2 are disposed alternately in the first direction Y to improve uniformity of a layout of the electrode lines 23b in the touch electrodes 23, thereby improving touch effectiveness of the touch electrodes 23. That is, the touch electrodes 23 and the touch signal lines 21 are mainly in a compensating relation. The touch electrodes 23 and the touch signal lines 21 compensate each other to cover an entire periphery of the sub-pixel 121 as much as possible. Therefore, disposing the touch signal line 21 as much as possible and reducing the impedance of the touch signal lines 21 can be achieved, and a touch effective area of the touch electrodes 23 can also be ensured.

In some embodiments, the first unit T1 and the second unit T2 can also be arranged non-alternately in the first direction Y. For example, in the first direction Y, there are two first units T1 and one second unit T2 followed by one first unit T1 and three second units T2; or other arrangements can also be allowed.

Please refer to FIG. 2. In the first embodiment, in the second direction X, the plurality of sub-pixels 121 are arranged in columns, and the sub-pixels 121 between adjacent columns are arranged in a staggered manner. In the first direction Y, the plurality of sub-pixels 121 are arranged in rows, and the sub-pixels 121 between adjacent rows are also arranged in a staggered manner. The touch signal lines 21 and the electrode lines 23b are disposed on a periphery of the sub-pixels 121. In some embodiments, the plurality of sub-pixels 121 can be arranged in a matrix manner or can be arranged according to other manners.

In a front-view pattern composed of the touch structure layer and the sub-pixels 121, referring to FIG. 2, in a region of a certain column of the sub-pixels 121, a part of the signal main lines 211 and the electrode sub-lines 232 are disposed alternately.

In a region of another column of the sub-pixels 121, the redundant signal lines 212 and a part of the electrode main lines 231 are disposed alternately.

It should be noted that "another column" is a column different from "a certain column", and "another row" is a row different from "a certain row".

Optionally, in the first embodiment, one row of the first sub-pixels 12a and one row of mixed sub-pixels 121 disposed alternately in the second direction X are taken as an example for description, but it is not limited thereto. Wherein, one row of the mixed sub-pixels 121 includes second sub-pixels 12b and third sub-pixels 12c. Colors of the first sub-pixels 12a, the second sub-pixels 12b, and the third sub-pixels 12c are different.

Optionally, the first sub-pixels 12a are green sub-pixels, the second sub-pixels 12b are red sub-pixels, and the third sub-pixel 12c are blue sub-pixels. Optionally, the plurality of green sub-pixels 12a are arranged into pure-color columns along the second direction X, and the plurality of green sub-pixels 12a are arranged in pure-color rows along the first direction Y. The blue sub-pixels 12c and the red sub-pixels 12b are disposed alternately into mixed-color columns along the second direction X, and the blue sub-pixels 12c and the red sub-pixels 12b are disposed alternately into mixed-color rows along the first direction Y. Wherein, the pure-color columns and the mixed-color columns are disposed alternately along the first direction Y, and the pure-color rows and the mixed-color rows are disposed alternately along the second direction X.

Specifically, a region of a certain column of the sub-pixels 121 is configured as a first region H1, and a region of another row of the sub-pixels 121 is configured as a second region H2. Wherein, the first region H1 and the second region H2 are spaced apart by one mixed-color column in the first direction Y to improve the uniformity of the layout of the electrode lines 23b.

In the first embodiment, an example that the region where the second pure-color column is located is the first region H1, and the region where the first pure-color column is located is the second region H2 is taken for description, but it is not limited thereto.

In the first region H1, the signal main lines 211 and the electrode sub-lines 232 are disposed alternately. In the second region H2, the redundant signal lines 212 and the electrode main lines 231 are disposed alternately.

Optionally, in a region of a certain row of the sub-pixels 121, the electrode main lines 231 are disposed on one side of the sub-pixels 121, and two adjacent first units T1 are spaced apart by at least one sub-pixel 121.

In a region of another row of the sub-pixels 121, the signal main lines 211 are disposed on one side of the sub-pixels 121, and two adjacent second units T2 are spaced apart by at least one sub-pixel 121.

Specifically, a region of a certain row of the sub-pixels 121 is configured as a third region H3, and a region of another row of the sub-pixels 121 is configured as a fourth region H4. A region of yet another row of the sub-pixels 121 is configured as a fifth region H5.

In the first embodiment, an example that the region where the third pure-color row is located is the third region H3, the region where the first pure-color row is located is the fourth region H4, and the region where the second pure-color row is located is the fifth region H5 is taken for description, but it is not limited thereto.

In the third region H3, the electrode main lines 231 are disposed on one side of the green sub-pixels 12a; the first units T1 are disposed on another side of the green sub-pixels 12a, i.e., the electrode sub-lines 232 are disposed on another side of the green sub-pixels 12a. Two adjacent first units T1 are spaced apart by at least one sub-pixel 121. Specifically, two adjacent electrode sub-lines 232 are spaced apart by one green sub-pixel 12a.

In the fourth region H4, the signal main lines 211 are disposed on one side of the green sub-pixels 12a; the second units T2 are disposed on another side of the green sub-pixels 12a, i.e., the redundant signal lines 212 are disposed on another side of the green sub-pixels 12a. Two adjacent second units T2 are spaced apart by at least one sub-pixel 121. Specifically, two adjacent redundant signal lines 212 are spaced apart by one green sub-pixel 12a.

In the fifth region H5, the signal main lines 211 and the electrode main lines 231 are symmetrically disposed about a center line of the green sub-pixels 12a.

Wherein, in the third region H3 and the fourth region H4, the first unit T1 and the second unit T2 are disposed alternately, i.e., one electrode sub-line 232 and one redundant signal line 212 are disposed alternately.

Optionally, front-view patterns of two signal main lines 211 in adjacent rows are mirror images of each other.

Figure 4:
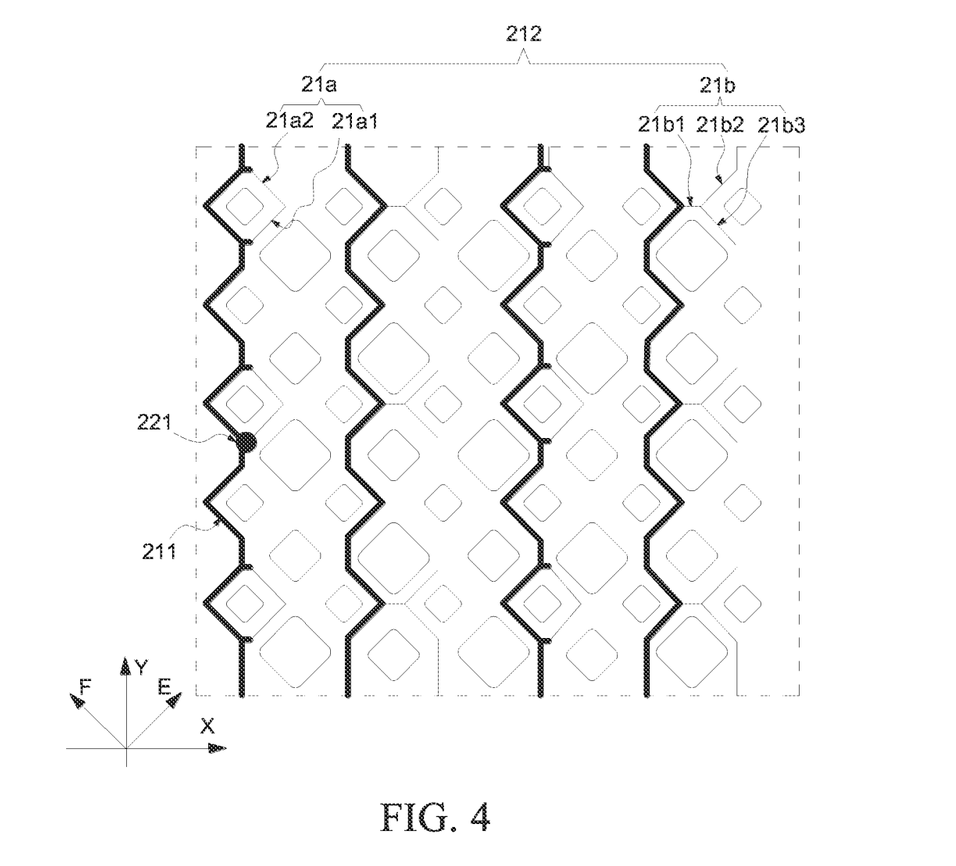
FIG. 4 is a structural schematic diagram of touch signal lines and sub-pixels in FIG. 2.

Optionally, please refer to FIG. 4. The plurality of redundant signal lines 212 include first redundant signal lines 21a and second redundant signal lines 21b. In the region of another column of the sub-pixels 121, i.e., in the second region H2, the first redundant signal lines 21a and the second redundant signal lines 21b are disposed alternately.

In the first embodiment, the touch signal lines 21 at least encircle a part of a row of first sub-pixels 12a adjacent to the touch signal lines 21.

Specifically, the redundant signal lines 212 include first redundant signal lines 21a disposed extending along the direction of any side of the signal main lines 211. The first redundant signal lines 21a and the signal main lines 211 connected to the first redundant signal lines 21a encircle the first sub-pixels 12a adjacent to the signal main lines 211.

The redundant signal lines 212 include second redundant signal lines 21b disposed extending along the direction of any side of the signal main lines 211. The second redundant signal lines 21b and the signal main lines 211 connected to the second redundant signal lines 21b encircle a part of the first sub-pixels 12a adjacent to the signal main lines 211.

Specifically, the first redundant signal lines 21a include first line segments 21a1 and second line segments 21a2. The first line segments 21a1 extend from the signal main lines 211 along a third direction E. The second line segments 21a2 extend from the first line segments 21a2 along a fourth direction F and are connected to the signal main lines 211.

The second redundant signal lines 21b include third line segments 21b1, fourth line segments 21b2, and fifth line segments 21b3. The third line segments 21b1 extend from the signal main lines 211 along the second direction X. The fourth line segments 21b2 extend from the third line segments 21b3 along the third direction E. The fifth line segments 21b3 extend from the third line segments 21b1 along a direction opposite to the fourth direction F.

Optionally, in one same plane, the second direction X, the first direction Y, the third direction E, and the fourth direction F intersect in pairs. Optionally, the third direction E is perpendicular to the fourth direction F. An included angle between the second direction X and the third direction E can be degrees, but it is not limited thereto.

Figure 5:
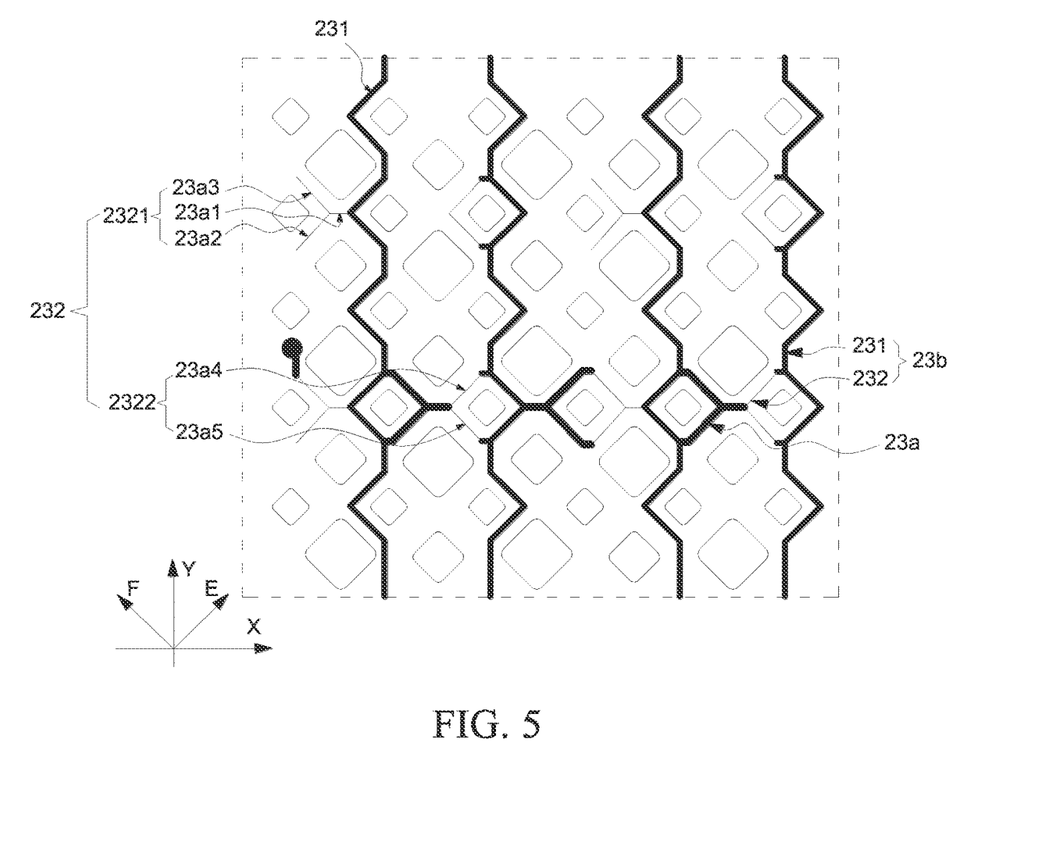
FIG. 5 is a structural schematic diagram of touch electrodes and the sub-pixels in FIG. 2.

Optionally, please refer to FIG. 5. The plurality of electrode sub-lines 232 include a first electrode sub-line 2321 and a second electrode sub-line 2322. In the region of a certain column of the sub-pixels 121, i.e., in the second region H2, the first electrode sub-line 2321 and the second electrode sub-line 2322 are disposed alternately.

The first electrode sub-line 2321 includes sixth line segments 23a1, seventh line segments 23a2, and eighth line segments 23a3. The sixth line segments 23a1 extend from the electrode main lines 231 along a direction opposite to the second direction X. The seventh line segments 23a2 extend from the sixth line segments 23a1 along a direction opposite to the third direction E. The eighth line segments 23a3 extend from the sixth line segments 23a1 along the fourth direction F.

The second electrode sub-line 2322 includes ninth line segments 23a4 and tenth line segments 23a5. The ninth line segments 23a4 extend from the electrode main lines 231 to the direction opposite to the third direction E. The tenth line segments 23a5 extend from the ninth line segments 23a4 along the direction opposite to the fourth direction F and are connected the electrode main lines 231.

Wherein, in the first direction Y, the first redundant signal lines 21a and the first electrode sub-lines 2321 are disposed alternately, and the second redundant signal lines 21b and the second electrode sub-lines 2322 are disposed alternately, so compensation relation of the touch signal lines 21 and the touch electrodes 23 is achieved.

In addition, redundant signal lines 212 and electrode sub-lines 232 of different shapes are adopted in the touch display panel 100 of the first embodiment to surround the sub-pixels 121 as much as possible, so lengths of the redundant signal lines 212 and electrode sub-lines 232 are increased, thereby increasing layout areas of the two.

Please refer to FIG. 6, the difference between the second embodiment and the first embodiment is that the first unit T1 includes a plurality of electrode sub-lines 232. The second unit T2 includes a plurality of redundant signal lines 212. In the second embodiment, an example of the first unit T1 including two electrode sub-lines 232 and the second unit T2 including two redundant signal lines 212 is taken for description, but it is not limited thereto.

Specifically, an arrangement pattern of the sub-pixels 121 in the second embodiment is consistent with an arrangement pattern of the first embodiment.

In the second embodiment, an example that the region where the first pure-color column is located is the first region H1, and the region where the second pure-color column is located is the second region H2 is taken for description, but it is not limited thereto.

In the first region H1, the signal main lines 211 and the electrode main lines 231 are disposed alternately. In the second region H2, the redundant signal lines 212 and the electrode main lines 231 are disposed alternately.

In the second embodiment, an example that the region where the third pure-color row is located is the third region H3, the region where the first pure-color row is located is the fourth region H4, and the region where the second pure-color row is located is the fifth region H5 is taken for description, but it is not limited thereto.

In the third region H3, the electrode main lines 231 are disposed on one side of the green sub-pixels 12a; the first units T1 are disposed on another side of the green sub-pixels 12a, i.e., the electrode sub-lines 232 are disposed on another side of the green sub-pixels 12a. Two adjacent first units T1 are spaced apart by at least one sub-pixel 121. Specifically, two adjacent electrode sub-lines 232 are spaced apart by one green sub-pixel 12a.

In the fourth region H4, the signal main lines 211 are disposed on one side of the green sub-pixels 12a; the second units T2 are disposed on another side of the green sub-pixels 12a, i.e., the redundant signal lines 212 are disposed on another side of the green sub-pixels 12a. Two adjacent second units T2 are spaced apart by at least one sub-pixel 121. Specifically, two adjacent redundant signal lines 212 are spaced apart by one green sub-pixel 12a.

In the fifth region H5, the signal main lines 211 and the electrode main lines 231 are symmetrically disposed about a center line of the green sub-pixels 12a.

Wherein, in the third region H3 and the fourth region H4, the first unit T1 and the second unit T2 are disposed alternately, i.e., two successive electrode sub-lines 232 and two successive redundant signal lines 212 are disposed alternately.

In addition, the structure of the second embodiment is similar or same as the structure of the first embodiment.

Figure 8:
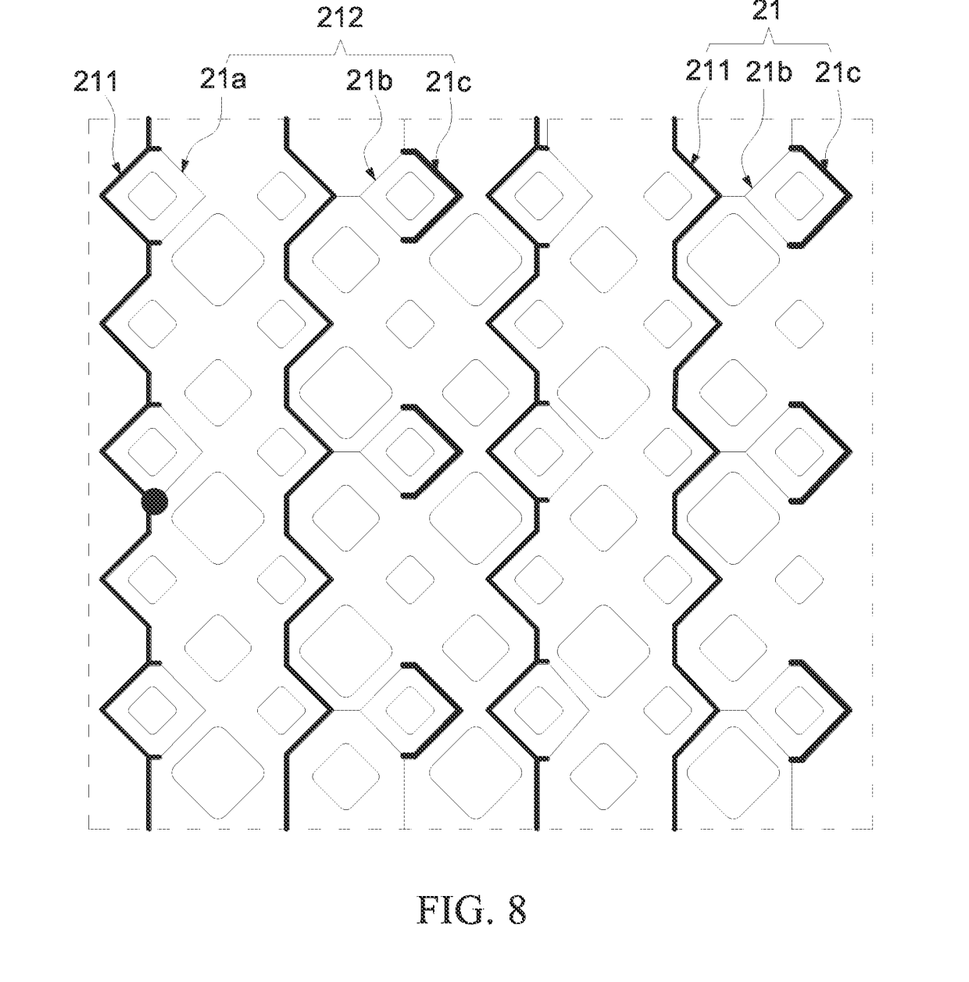
FIG. 8 is a structural schematic diagram of the touch signal lines and the sub-pixels in FIG. 7.

Please refer to FIG. 7 and FIG. 8. The difference between the third embodiment and the aforesaid embodiments is that on the basis of the aforesaid embodiment, at least one touch signal line 21 further includes a third redundant signal line 21c extending along a direction of a side of the second redundant signal lines 21b. The third redundant signal lines 21c and the second redundant signal lines 21b connected to the third redundant signal lines 21c encircle the first sub-pixels 12a adjacent to the signal main lines 211.

A part of the electrode lines 23b is disposed overlapping the third redundant signal lines 21c.

The third embodiment is described on the basis of the first embodiment. Specifically, the third redundant signal lines 21c extend outward from the second redundant signal lines 21b to reduce impedance of the touch signal lines 21.

A part of the electrode main lines 231 is disposed overlapping the third redundant signal lines 21c to increase a light transmittance rate of the touch display panel 100.

In some embodiments, the third redundant signal lines 21c can also extend outward from the first redundant signal lines 21a.

In the touch structure layer of the embodiments of the present application, by adopting the touch signal lines and the electrode lines disposed alternately along the first direction, and by adopting the first redundant signal line and the electrode sub-line spaced apart and arranged along the first direction, the impedance of the touch signal line is reduced, and the wiring region of the electrode lines in the touch electrodes is ensured.

The above embodiments of the present application describe the touch display panel in detail. This article uses specific cases for describing the principles and the embodiments of the present application, and the description of the embodiments mentioned above is only for helping to understand the method and the core idea of the present application. Meanwhile, for those skilled in the art, will have various changes in specific embodiments and application scopes according to the idea of the present application. In summary, the content of the specification should not be understood as limit to the present application.

What is claimed is:

1. A touch display panel, comprising a substrate, a light-emitting device layer, and a touch structure layer disposed sequentially in a stacked manner, wherein the light-emitting device layer comprises a plurality of rows of first sub-pixels arranged along a first direction, the touch structure layer comprises a touch signal line sub-layer and a touch electrode sub-layer disposed on a layer different from the touch signal line sub-layer, the touch electrode sub-layer comprises a plurality of touch electrodes, the touch signal line sub-layer comprises a plurality of touch signal lines, and each of the touch signal lines is connected to one of the touch electrodes correspondingly; and wherein each of the touch signal lines comprises signal main lines extending along the first direction and disposed on a side of one row of the first sub-pixels and redundant signal lines disposed extending along a direction of any side of the signal main lines;

any one of the signal main lines and signal main lines adjacent to one side of the one of the signal main lines are spaced apart by at least two rows of the first sub-pixels, and the one of the signal main lines and signal main lines adjacent to another side of the one of the signal main lines are spaced apart by at least one row of the first sub-pixels; and wherein the touch signal lines at least encircle a part of a row of the first sub-pixels adjacent to the touch signal lines, the redundant signal lines comprise:

first redundant signal lines disposed extending along the direction of any side of the signal main lines, and the first redundant signal lines and the signal main lines connected to the first redundant signal lines encircle the first sub-pixels adjacent to the signal main lines, and second redundant signal lines disposed extending along the direction of any side of the signal main lines, and the second redundant signal lines and the signal main lines connected to the second redundant signal lines encircle a part of the first sub-pixels adjacent to the signal main lines, wherein the first redundant signal lines comprise first line segments and second line segments, the second redundant signal lines comprise third line segments, fourth line segments, and fifth line segments, the third line segments extend from the signal main lines along a second direction, the fourth line segments extend from a third line segments along a third direction, and the fifth line segments extend from the third line segments along a fourth direction, and the first line segments extend from the signal main lines along the third direction, and the second line segments extend from the first line segments along the fourth direction and are connected to the signal main lines.

2. The touch display panel as claimed in claim 1, wherein the touch electrodes comprise a plurality of electrode lines electrically connected to each other, the electrode lines comprise electrode main lines and electrode sub-lines, and the electrode sub-lines are disposed extending along a direction of any side of the electrode main lines;
   at least one of the electrode sub-lines composes a first unit;
   at least one of the redundant signal lines composes a second unit; and
   the signal main lines are arranged with the electrode main lines in the second direction in a front-view pattern of the touch structure layer; and the first unit is arranged with the second unit in the first direction.

3. The touch display panel as claimed in claim 2, wherein the signal main lines and the electrode main lines are disposed alternately in the second direction, and the first unit and the second unit are disposed alternately in the first direction.

4. The touch display panel as claimed in claim 3, wherein the light-emitting device layer comprises a plurality of sub-pixels, and
   the sub-pixels are arranged in columns along the second direction;
   the touch signal lines and the electrode lines are disposed on a periphery of the sub-pixels; and
   a part of the signal main lines and the electrode sub-lines are disposed alternately in a region of one column of the sub-pixels in a front-view pattern composed of the touch structure layer and the sub-pixels.

5. The touch display panel as claimed in claim 4, wherein the redundant signal lines and a part of the electrode main lines are disposed alternately in a region of another column of the sub-pixels.

6. The touch display panel as claimed in claim 4, wherein the sub-pixels are arranged in rows along the first direction; and in a region of one row of the sub-pixels, the electrode main lines are disposed on a side of the sub-pixels, and two adjacent first units are spaced apart by at least one of the sub-pixels.

7. The touch display panel as claimed in claim 6, wherein in a region of another row of the sub-pixels, the signal main lines are disposed on the side of the sub-pixels, and two adjacent second units are spaced apart by at least one of the sub-pixels.

8. The touch display panel as claimed in claim 2, wherein the redundant signal lines comprise third redundant signal lines disposed extending along a direction of a side of the second redundant signal lines, and the third redundant signal lines and the second redundant signal lines connected to the third redundant signal lines encircle the first sub-pixels adjacent to the signal main lines.

9. The touch display panel as claimed in claim 8, wherein the third redundant signal lines are disposed overlapping a part of the electrode main lines.

10. The touch display panel as claimed in claim 2, wherein the touch electrodes further comprise connection lines disposed on a same layer as the electrode lines, the connection lines are connected between two adjacent electrode lines, and the connection lines are disposed partially overlapping the touch signal lines.

11. The touch display panel as claimed in claim 1, wherein the touch structure layer further comprises an insulation layer disposed between the touch signal line sub-layer and the touch electrode sub-layer, at least one via hole is defined on the insulation layer, and one of the touch electrodes is electrically connected to the touch signal lines corresponding to the one of the touch electrodes through the at least one via hole.

12. The touch display panel as claimed in claim 11, wherein the touch display panel further comprises an encapsulation layer disposed on the light-emitting device layer, and the touch signal line sub-layer, the insulation layer, and the touch electrode sub-layer are sequentially disposed on the encapsulation layer.

13. The touch display panel as claimed in claim 11, wherein the touch display panel further comprises an encapsulation layer disposed on the light-emitting device layer, and the touch electrode sub-layer, the insulation layer, and the touch signal line sub-layer are sequentially disposed on the encapsulation layer.

14. The touch display panel as claimed in claim 1, wherein lengths of the plurality of touch signal lines are same.

15. The touch display panel as claimed in claim 14, wherein the touch display panel comprises a display region and a peripheral region disposed on a side of the display region, the touch electrodes are disposed in the display region in a matrix manner; and
   the touch display panel further comprises a touch chip and a plurality of peripheral wirings, the touch chip and the peripheral wirings are disposed in the peripheral region, the peripheral wirings are electrically connected to the touch chip, and each of the peripheral wirings is electrically connected to one of the touch signal lines.

16. The touch display panel as claimed in claim 1, wherein the touch electrodes are disposed in a display region in a matrix manner.

17. A touch display panel, comprising a substrate, a light-emitting device layer, and a touch structure layer disposed sequentially in a stacked manner, wherein the light-emitting device layer comprises a plurality of rows of first sub-pixels arranged along a first direction, the touch structure layer comprises a touch signal line sub-layer and a touch electrode sub-layer disposed on a layer different from the touch signal line sub-layer, the touch electrode sub-layer comprises a plurality of touch electrodes, the touch signal line sub-layer comprises a plurality of touch signal lines, and each of the touch signal lines is connected to one of the touch electrodes correspondingly; and
   wherein each of the touch signal lines comprises signal main lines extending along the first direction and disposed on a side of one row of the first sub-pixels and redundant signal lines disposed extending along a direction of any side of the signal main lines;
   any one of the signal main lines and signal main lines adjacent to one side of the one of the signal main lines are spaced apart by at least two rows of the first sub-pixels, and the one of the signal main lines and signal main lines adjacent to another side of the one of the signal main lines are spaced apart by at least one row of the first sub-pixels;
   wherein the touch signal lines at least encircle a part of a row of the first sub-pixels adjacent to the touch signal lines,
   the redundant signal lines comprise:
     first redundant signal lines disposed extending along the direction of any side of the signal main lines, and the first redundant signal lines and the signal main lines connected to the first redundant signal lines encircle the first sub-pixels adjacent to the signal main lines,
     second redundant signal lines disposed extending along the direction of any side of the signal main lines, and the second redundant signal lines and the signal main lines connected to the second redundant signal lines encircle a part of the first sub-pixels adjacent to the signal main lines, and third redundant signal lines disposed extending along a direction of a side of the second redundant signal lines, and the third redundant signal lines and the second redundant signal lines connected to the third redundant signal lines encircle the first sub-pixels adjacent to the signal main lines;

wherein the touch electrodes comprise a plurality of electrode lines electrically connected to each other, the electrode lines comprise electrode main lines and electrode sub-lines, and the electrode sub-lines are disposed extending along a direction of any side of the electrode main lines, at least one of the electrode sub-lines composes a first unit, at least one of the redundant signal lines composes a second unit, the signal main lines are arranged with the electrode main lines in a second direction in a front-view pattern of the touch structure layer, and the first unit is arranged with the second unit in the first direction.

18. The touch display panel as claimed in claim 17, wherein the signal main lines and the electrode main lines are disposed alternately in the second direction, and the first unit and the second unit are disposed alternately in the first direction.

19. The touch display panel as claimed in claim 18 wherein the light-emitting device layer comprises a plurality of sub-pixels, and the sub-pixels are arranged in columns along the second direction;

the touch signal lines and the electrode lines are disposed on a periphery of the sub-pixels; and a part of the signal main lines and the electrode sub-lines are disposed alternately in a region of one column of the sub-pixels in a front-view pattern composed of the touch structure layer and the sub-pixels.

20. The touch display panel as claimed in claim 17, wherein the third redundant signal lines are disposed overlapping a part of the electrode main lines.

* * * * *